(12) United States Patent
Takemura

(10) Patent No.: US 6,484,098 B1
(45) Date of Patent: Nov. 19, 2002

(54) GPS METHOD AND APPARATUS, NAVIGATION SYSTEM, PROGRAM STORAGE DEVICE AND COMPUTER DATA SIGNAL EMBODIED IN CARRIER WAVE

(75) Inventor: Hajime Takemura, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/138,425

(22) Filed: May 6, 2002

(30) Foreign Application Priority Data

May 8, 2001 (JP) ........................................ 2001-137795

(51) Int. Cl.[7] ................................................ G01S 5/62
(52) U.S. Cl. .................... 701/213; 701/214; 342/357.12
(58) Field of Search ................................. 701/213, 214, 701/215, 216, 207; 702/89, 150; 342/357.02, 357.04, 357.06, 357.12

(56) References Cited

U.S. PATENT DOCUMENTS 6,067,045 A * 5/2000 Cagtelloe et al. ........... 701/213
6,104,974 A * 8/2000 Harrison et al. ............ 701/214
6,191,730 B1 * 2/2001 Nelson, Jr. ............. 347/357.12
6,236,354 B1 * 5/2001 Krasner ................. 342/357.12
6,246,959 B1 * 6/2001 Nakajima ................... 701/214

* cited by examiner

Primary Examiner—Richard M. Camby
(74) Attorney, Agent, or Firm—Morgan, Lewis & Bockius LLP (57) ABSTRACT

A GPS apparatus measures each pseudo-range ri from respective one of received radio waves from n GPS satellites (200*i*) captured by a GPS receiver (18) and approximately calculates a clock error t and coordinates (x, y, z) of the GPS receiver as a solution of n simultaneous equations by performing a convergence calculation with respect to n functions having such variables as the clock error t and the coordinates (x, y, z) of the GPS receiver. If a generation of a multi-path is detected, it approximately calculates the clock error t and the coordinates as a solution of n+1 simultaneous equations by performing a convergence calculation with respect to total n+1 functions obtained by adding one α fn+1 to the n functions, where α fn+1 is obtained by applying a weighting α to one function fn+1 having such variables as the clock error and the coordinates.

15 Claims, 5 Drawing Sheets

GPS METHOD AND APPARATUS, NAVIGATION SYSTEM, PROGRAM STORAGE DEVICE AND COMPUTER DATA SIGNAL EMBODIED IN CARRIER WAVE

BACKGROUND OF THE INVENTION

1. Field of the Invention

The present invention generally relates to a GPS (Global Positioning System) method of and a GPS apparatus for measuring or positioning a current position of a movable body on the basis of radio waves received from GPS satellites and to a navigation system including the GPS apparatus. The present invention also relates to a program storage device and a computer data signal embodiment in a carrier wave, which allow a computer to function as the GPS apparatus.

2. Description of the Related Art

In recent years, a GPS measurement has been broadly used in a navigation system of a movable body such as a vehicle, an airplane, a ship, or the like. Coordinates of the GPS satellites, which are the basis of the GPS measurement, are obtained by solving the Kepler's equation with the system time included in the transmitted data of the received radio waves i.e., in the down links, at a plurality of monitor stations on the earth. Then, an orbit constant (position) of the satellite as obtained in this manner is transmitted as one portion of the transmitted data of the transmitted radio wave i.e., the up link, to the corresponding GPS satellite. As a result, each GPS satellite transmits its own position information included in the down link data.

In the case of 3D (3-dimensional) positioning measurement based on the radio waves received from the GPS satellites in this kind, it measures a pseudo-range r, which is a distance from a GPS receiver to each GPS satellite, on the basis of (i) the position information of each GPS satellite included in the radio wave received from each GPS satellite and (ii) a time length required for the received radio wave coming from each GPS satellite to the GPS receiver, basically as to four GPS satellites. This pseudo-range r is represented as a four-variable function of a clock error t and the coordinates (x, y, z) of the GPS receiver. Therefore, if the four pseudo-ranges r are measured depending on the radio waves received from the four GPS satellites, the four functions are obtained, so that the clock error t and the coordinates (x, y, z) of the GPS receiver can be calculated by solving the four nonlinear simultaneous equations. Then, the above-calculated coordinates are regarded as the current position of a movable body on which the GPS receiver is mounted.

In fact, however, it often happens that the radio waves from five or more GPS satellites can be received at the same time, and thus, a positioning solution of five (or six or more) nonlinear simultaneous equations for four variables x, y, z and t are calculated by the least square method on the basis of the five or more pseudo-ranges r to increase a positioning accuracy.

By the way, one disadvantage of the GPS measurement is the generation of measurement error of the pseudo-range by a multi-path. More specifically, the radio wave from the GPS satellite may have other paths to go through to the GPS receiver after reflecting on the surface of a huge building or the like once or more times, in addition to the path to go direct to the GPS receiver, especially around the huge building such as a skyscraper, a high-rise building, or the like. This phenomenon, under which the radio waves are received at the same time through a plurality of radio wave paths from the one identical GPS satellite, is called as a "multi-path". When the multi-path is generated, an error is generated in the time length required for the received radio waves coming to the GPS receiver, and on the basis of this error, an error is generated in the pseudo-range. Then, when the multi-path is generated, the pseudo-range based on a regular radio wave path and the pseudo-ranged based on an irregular radio wave path are irregularly and alternatively measured, so that the arrival time and the pseudo-range are changed or flickered at a short cycle. Thus, the accuracy of the GPS measurement deteriorates extremely.

Therefore, a device for detecting the generation of the multi-path is installed, and if the multi-path is generated, such a correction that the GPS satellite related to the generation of the multi-path is eliminated from an object of the GPS measurement is performed, for example. According to this detection and correction of the multi-path, when the generation of the multi-path is detected as for the one or more received radio waves, this or these are eliminated from the measurement object and it is performed the GPS measurement based on at least four received radio waves. Moreover, in the case that only three received radio waves are left as a result of eliminating the radio waves, in each of which the generation of the multi-path is detected ,from the measurement object because of a bad environment of receiving radio waves, such a technique that the GPS measurement is performed by switching the 3D positioning measurement to the 2D positioning measurement has been developed. More concretely, in the GPS 2D positioning measurement, the pseudo-range from each GPS satellite to the GPS receiver is measured by using (i) the time length required for the received radio wave to reach from each GPS satellite to the GPS receiver, and (ii) the position information of each GPS satellite, which is included in the radio wave received from each GPS satellite, basically about three GPS satellites under the assumption that their distances from the earth are rarely changed for a short time.

However, according to the present inventors' research, the above-mentioned technique, which detects the generation of the multi-path and eliminates the error of the pseudo-range, is not essentially accurate on its detection. Thus, there is a problem that the radio wave received through the normal radio wave path may be often erroneously eliminated from the measurement object of the GPS measurement by mis-detection of the multi-path and the accuracy of the GPS measurement further deteriorates.

SUMMARY OF THE INVENTION

It is therefore an object of the present invention to provide a GPS method and a GPS apparatus, which can detect the generation of the multi-path and correct an error of the pseudo-range caused by the effect of the multi-path, as well as reduce the deterioration of the positioning accuracy even when the generation of the multi-path is erroneously detected, a navigation system including the GPS apparatus, a program storage device and a computer data signal embodiment in a carrier wave, which allow a computer to function as the GPS apparatus.

The above object of the present invention can be achieved by a GPS method provided with: a measurement process of measuring each pseudo-range ri (i=1, 2, . . . , n) from respective one of received radio waves from n GPS satellites (n is a natural number equal to or greater than 3) captured by a GPS receiver mounted on a movable body; a detection process of detecting a generation of a multi-path of the respective one of the received radio waves; a first calculation process of approximately calculating a clock error t and coordinates (x, y, z) of the GPS receiver as a solution of n simultaneous equations by performing a convergence calculation with respect to n functions fi (x, y, z, t) having such variables as the clock error t and the coordinates (x, y, z), each of the n functions fi (x, y, z, t) representing the pseudo-range ri; a second calculation process of approximately calculating the clock error t and the coordinates (x, y, z) as a solution of n+1 simultaneous equations by performing a convergence calculation with respect to total n+1 functions obtained by adding one α fn+1 (x, y, z, t) to the n functions fi (x, y, z, t), where the one α fn+1 (x, y, z, t) is obtained by applying a weighting α (α is a real number which is equal to or greater than 1) to one function fn+1 (x, y, z, t) having such variables as the clock error t and the coordinates (x, y, z), the one function fn+1 (x, y, z, t) representing a pseudo-range rn+1 obtained when the center of the earth is regarded as one GPS satellite; an output process of outputting the coordinates (x, y, z) calculated in the first or second calculation process as current position data, which indicate a current position of the movable body; and a selection process of selecting the second calculation process when the generation of the multi-path is detected by the detection process.

According to the GPS method of the present invention, the measurement process measures each pseudo-range ri from the respective one of received radio waves from n GPS satellites captured by the GPS receiver. This measurement is basically performed by measuring a time length required for the arrival and by multiplying this by the velocity of light. Then, the detection process detects the generation of the multi-path on the received radio wave on the basis of whether or not the measurement result, which is supposed to be obtained experientially, experimentally, or theoretically when the multi-path is generated, is actually obtained; for example, such a result that the pseudo-range ri, as measured above, is unstable. Here, if the generation of the multi-path is not detected by the detection process, the first calculation process performs the convergence calculation, for example, that according to Newton method with respect to the n functions fi (x, y, z, t), each of which represents the pseudo-range ri. Consequently, it approximately calculates the clock error t and the coordinates (x, y, z) as a positioning solution of the n nonlinear simultaneous equations. As a result, it calculates the coordinates (x, y, z), which indicate the current position of the movable body, with a high accuracy under the condition that the multi-path is not generated.

On the other hand, if the detection process detects the generation of the multi-path, the selection process selects the second calculation process. Then, the second calculation process performs the convergence calculation, for example, that according to Newton method with respect to the total n+1 functions obtained by adding one α fn+1 (x, y, z, t) to the n functions fi (x, y, z, t), each of which represents the pseudo-range ri. This one α fn+1 (x, y, z, t) is obtained by applying a weighting α (α is a real number which is equal to or greater than 1) to one function fn+1 (x, y, z, t) having such variables as the clock error t and the coordinates (x, y, z), which represents a pseudo-range rn+1 obtained when the center of the earth is regarded as one GPS satellite. Consequently, it approximately calculates the clock error t and the coordinates (x, y, z) as a positioning solution of the n+1 nonlinear simultaneous equations. As a result, under the condition of the multi-path generation, as the weighting α is applied to the terms associated with the pseudo-range rn+1 supposed to be stabilized in correspondence to the condition that the earth is regarded as the GPS satellite, the coordinates (x, y, z) as the positioning solution are stabilized. In the case that the generation of the multi-path is misdetected despite of non-generation of the multi-path in the detection process, as the weighting α is applied to the terms associated with the pseudo-range rn+1 supposed to be stabilized in correspondence to the condition that the earth is regarded as the GPS satellite, the coordinates (x, y, z) as the positioning solution are stabilized. Then, the output process outputs the coordinates, which have the decreased dispersion or deviation arose from an error caused by the multi-path generation or by the misdetection of it, as the current position data, which indicate the current position of the movable body.

As described above, both when the multi-path is actually generated and when the generation of the multi-path is misdetected, it is possible to calculate the coordinates (x, y, z) as the stable positioning solution without knowing which case is happening. Especially, considering such a reality that it is difficult to increase the accuracy in the detection of the multi-path generation, the present invention is extremely profitable in practice because it can obtain substantially the stable GPS measurement results despite of whether or not the detection of the multi-path generation is performed properly.

In one aspect of the GPS method, the n functions fi (x, y, z, t) are as follows: ri'+(∂ri/∂x)Δx+(∂ri/∂y)Δy+(∂ri/∂z) Δz+(∂ri/∂t)Δt, where ri' is an approximate value of ri, the one function fn+1 (x, y, z, t) is as follows: rn+1'+(∂rn+1/∂x)Δx+(∂rn+1/∂y)Δy+(∂rn+1/∂z)Δz+(∂rn+1/∂t)Δt, where rn+1' is an approximate value of rn+1, and the convergence calculation is a calculation for converging a pseudo-range error Δri=|ri−ri'| (i=1, 2, . . . , n) within a predetermined value in the n simultaneous equations in the first calculation process and a calculation for converging a pseudo-range error Δri=|ri−ri'| (i=1, 2, . . . , n, n+1) within a predetermined value in the n+1 simultaneous equations in the second calculation process.

According to this aspect, it is possible to calculate the coordinates (x, y, z) as the positioning solution by performing the calculation of converging the pseudo-range error Δri=|ri−ri'| within the predetermined value such as a very small value which is, for example, close to 0 relatively easily and quickly by using a computer or the like in the first and the second calculation processes.

The predetermined value used for this convergence calculation is set in correspondence to the desired positioning accuracy, and it generally approaches 0 with the positioning accuracy increased and generally departs from 0 with the positioning accuracy decreased. This kind of predetermined value is set in advance depending on the desired positioning accuracy experientially, experimentally, or theoretically.

In another aspect of the GPS method, the second calculation process uses a function fn+1 (x, y, z, t) which estimates the clock error t instead of the one function.

According to this aspect, if the detection process detects the generation of the multi-path, the second calculation process performs the convergence calculation, for example, that according to Newton method with respect to the total n+1 functions obtained by adding one function fn+1 (x, y, z, t) which estimates the clock error t to the n functions fi (x, y, z, t), each of which represents the pseudo-range ri, after applying the weighting α, which is equal to or greater than 1, to the one function fn+1 (x, y, z, t). Consequently, it approximately calculates the clock error t and the coordinates (x, y, z) as a positioning solution of the n+1 nonlinear simultaneous equations. As a result, under the condition of the multi-path generation, as the weighting α is applied to the terms associated with the pseudo-range rn+1 supposed to be stabilized in correspondence to the estimation of the clock error t, the coordinates (x, y, z) as the positioning solution are stabilized. In the case that the generation of the multi-path is misdetected despite of non-generation of the multi-path in the detection process, as the weighting α is applied to the terms associated with the pseudo-range rn+1 supposed to be stabilized in correspondence to the estimation of the clock error t, the coordinates (x, y, z) as the positioning solution are stabilized. Then, the output process outputs the coordinates, which have the decreased dispersion or deviation arose from an error caused by the multi-path generation or by the misdetection of it, as the current position data, which indicate the current position of the movable body.

As described above, both when the multi-path is actually generated and when the generation of the multi-path is misdetected, it is possible to calculate the coordinates (x, y, z) as the stable positioning solution without knowing which case is happening.

Incidentally, it is also possible to calculate the coordinates (x, y, z) as the positioning solution by solving n+2 nonlinear simultaneous equations using the one function which estimates the clock error in addition to the one function obtained under the condition that the center of the earth is regarded as one GPS satellite, after applying the weighting α to at least one of the functions.

In another aspect of the GPS method, the first calculation process calculates a positioning solution (x, y, z, t) in converging $\Delta R = A \cdot \Delta X$ within a predetermined value when a pseudo-range error matrix of (n, 1) type is $\Delta R = (\Delta r1, \Delta r2, \ldots, \Delta rn)$ and a position error matrix of (4, 1) type is $\Delta X = (\Delta x, \Delta y, \Delta z, \Delta t)$ and a partial differential term matrix of (n, 4) type is A, and the second calculation process calculates a solution (x, y, z, t) in converging $\Delta R = A \cdot \Delta X$ within a predetermined value when a pseudo-range error matrix of (n+1, 1), in which the weighting α is applied to the n+1th row, is $\Delta R = (\Delta r1, \Delta r2, \ldots, \Delta rn, \alpha \cdot \Delta rn+1)$ and a position error matrix of (4, 1) type is $\Delta X = (\Delta x, \Delta y, \Delta z, \Delta t)$ and a partial differential term matrix of (n+1, 4) type in which the weighting α is applied to the n+1th row is A According to this aspect, it is possible to calculate the coordinates (x, y, z) as the positioning solution by performing the calculation of converging $\Delta R = A \cdot \Delta X$ within the predetermined value such as a very small value which is, for example, close to 0 relatively easily and quickly by a matrix operation by using a computer or the like in the first and the second calculation processes.

In another aspect of the GPS method, the detection process detects the generation of the multi-path depending on whether or not the pseudo-range ri measured by the measurement process is unstable.

According to this aspect, the generation of the multi-path is detected by the detection process depending on whether or not the pseudo-range ri measured by the measurement process is unstable. In other words, if the pseudo-range ri is not unstable according to a predetermined standard, the detection process regards the multi-path as the one without the generation, and if the pseudo-range ri is unstable according to the predetermined standard, the detection process regards the multi-path as the one with the generation.

In this aspect, the detection process may be constructed to detect the generation of the multi-path on the basis of variance of the pseudo-range ri measured by the measurement process.

By constituting in this manner, it is possible to detect the generation of the multi-path with relatively high accuracy and ease on the basis of the fact that the variance or dispersion of measurement values often varies between the captured GPS satellites when the multi-path is generated.

Incidentally, the first and the second calculation process may be performed by, for example, solving n (or n−1 or less) nonlinear simultaneous equations about the received radio waves remained after excluding one or more functions fi (x, y, z, t) corresponding to the received radio wave or waves, in each of which the multi-path generation is detected, from the operation object of the first and the second calculation processes. In general, the positioning solution can not be obtained if the operation object of the first and the second calculation processes are less than four functions including (i) the function which estimates the clock error and (ii) the function which indicates the pseudo-range and which is obtained when the center of the earth is regarded as the GPS satellite, so that at least four functions are adopted as the operation objects of the first and the second calculation processes.

The above object of the present invention can be achieved by a GPS apparatus comprising: a measurement device for measuring each pseudo-range ri (i=1, 2, . . . , n) from respective one of received radio waves from n GPS satellites (n is a natural number equal to or greater than 3) captured by a GPS receiver mounted on a movable body; a detection device for detecting a generation of a multi-path in the respective one of the received radio waves; a first calculation device for approximately calculating a clock error t and coordinates (x, y, z) of the GPS receiver as a solution of n simultaneous equations by performing a convergence calculation with respect to n functions fi (x, y, z, t) having such variables as the clock error t and the coordinates (x, y, z), each of the n functions fi (x, y, z, t) representing the pseudo-range ri; a second calculation device for approximately calculating the clock error t and the coordinates (x, y, z) as a solution of n+1 simultaneous equations by performing a convergence calculation with respect to total n+1 functions obtained by adding one α fn+1 (x, y, z, t) to the n functions fi (x, y, z, t), where the one α fn+1 (x, y, z, t) is obtained by applying a weighting α (α is a real number which is equal to or greater than 1) to one function fn+1 (x, y, z, t) having such variables as the clock error t and the coordinates (x, y, z), the one function fn+1 (x, y, z, t) representing a pseudo-range rn+1 obtained when the center of the earth is regarded as one GPS satellite; an output device for outputting the coordinates (x, y, z) calculated in the first or second calculation device as current position data, which indicate a current position of the movable body; and a selection device for selecting the second calculation device when the generation of the multi-path is detected by the detection device.

According to the GPS apparatus of the present invention, the measurement device measures each pseudo-range ri from the respective one of received radio waves from n GPS satellites captured by the GPS receiver. Here, if the generation of the multi-path is not detected by the detection device, the first calculation device performs the convergence calculation, for example, that according to Newton method with respect to the n functions fi (x, y, z, t), each of which represents the pseudo-range ri. Consequently, it approximately calculates the clock error t and the coordinates (x, y, z) as a positioning solution of the n nonlinear simultaneous equations. As a result, it calculates the coordinates (x, y, z), which indicate the current position of the movable body, with a high accuracy under the condition that the multi-path is not generated.

On the other hand, if the detection device detects the generation of the multi-path, the selection device selects the second calculation process. Then, the second calculation device performs the convergence calculation, for example, that according to Newton method with respect to the total n+1 functions obtained by adding one α fn+1 (x, y, z, t) to the n functions fi (x, y, z, t), each of which represents the pseudo-range ri. The one α fn+1 (x, y, z, t) is obtained by applying a weighting α (α is a real number which is equal to or greater than 1) to one function fn+1 (x, y, z, t) having such variables as the clock error t and the coordinates (x, y, z), which represents a pseudo-range rn+1 obtained when the center of the earth is regarded as one GPS satellite. As a result, under the condition of the multi-path generation, as the weighting α is applied to the terms associated with the pseudo-range rn+1 supposed to be stabilized in correspondence to the condition that the earth is regarded as the GPS satellite, the coordinates (x, y, z) as the positioning solution are stabilized. In the case that the generation of the multi-path is misdetected despite of non-generation of the multi-path in the detection device, as the weighting α is applied to the terms associated with the pseudo-range rn+1 supposed to be stabilized in correspondence to the condition that the earth is regarded as the GPS satellite, the coordinates (x, y, z) as the positioning solution are stabilized. Then, the output device outputs the coordinates, which have the decreased dispersion or deviation arose from an error caused by the multi-path generation or by the misdetection of it, as the current position data, which indicate the current position of the movable body.

As described above, both when the multi-path is actually generated and when the generation of the multi-path is misdetected, it is possible to calculate the coordinates (x, y, z) as the stable positioning solution without knowing which case is happening.

In one aspect of the GPS apparatus, the n functions fi (x, y, z, t) are as follows: ri'+(∂ri/∂x)Δx+(∂ri/∂y)Δy+(∂ri/∂z)Δz+(∂ri/∂t) Δt, where ri' is an approximate value of ri, the one function fn+1 (x, y, z, t) is as follows: rn+1'+(∂rn+1/∂x)Δx+(∂rn+1/∂y)Δy+(∂rn+1/∂z)Δz+(∂rn+1/∂t)Δt, where rn+1' is an approximate value of rn+1, and the convergence calculation is a calculation for converging a pseudo-range error Δri=|ri−ri'| (i=1, 2, . . . , n) within a predetermined value in the n simultaneous equations in the first calculation device and a calculation for converging a pseudo-range error Δri= |ri−ri'| (i=1, 2, . . . , n, n+1) within a predetermined value in the n+1 simultaneous equations in the second calculation device.

According to this aspect, it is possible to calculate the coordinates (x, y, z) as the positioning solution by performing the calculation of converging the pseudo-range error Δri=|ri−ri'| within the predetermined value such as a very small value which is, for example, close to 0 relatively easily and quickly by using a computer or the like in the first and the second calculation devices.

In another aspect of the GPS apparatus, the second calculation device uses a function fn+1 (x, y, z, t) which estimates the clock error t instead of the one function.

According to this aspect, if the detection device detects the generation of the multi-path, the second calculation device performs the convergence calculation, for example, that according to Newton method with respect to the total n+1 functions obtained by adding one function fn+1 (x, y, z, t) which estimates the clock error t to the n functions fi (x, y, z, t), each of which represents the pseudo-range ri, after applying the weighting α, which is equal to or greater than 1, to the one function fn+1 (x, y, z, t). As a result, under the condition of the multi-path generation, as the weighting α is applied to the terms associated with the pseudo-range rn+1 supposed to be stabilized in correspondence to the estimation of the clock error t, the coordinates (x, y, z) as the positioning solution are stabilized. In the case that the generation of the multi-path is misdetected despite of non-generation of the multi-path in the detection device, as the weighting α is applied to the terms associated with the pseudo-range rn+1 supposed to be stabilized in correspondence to the estimation of the clock error t, the coordinates (x, y, z) as the positioning solution are stabilized. Then, the output device outputs the coordinates, which have the decreased dispersion or deviation arose from an error caused by the multi-path generation or by the misdetection of it, as the current position data, which indicate the current position of the movable body.

In another aspect of the GPS apparatus, the first calculation device calculates a positioning solution (x, y, z, t) in converging ΔR=A·ΔX within a predetermined value when a pseudo-range error matrix of (n, 1) type is ΔR=(Δr1, Δr2, . . . , Δrn), a position error matrix of (4, 1) type is ΔX=(Δx, Δy, Δz, Δt), and a partial differential term matrix of (n, 4) type is A, and the second calculation device calculates a solution in converging ΔR=A·ΔX within a predetermined value when a pseudo-range error matrix of (n+1, 1) type in which the weighting α is applied to the n+1th row is ΔR=(Δr1, Δr2, . . . , Δrn, α·Δrn+1) and a position error matrix of (4, 1) type is ΔX=(Δx, Δy, Δz, Δt) and a partial differential term matrix of (n+1, 4) type in which the weighting α is applied to the n+1th row is A.

According to this aspect, it is possible to calculate the coordinates (x, y, z) as the positioning solution by performing the calculation of converging ΔR=A·ΔX within the predetermined value such as a very small value which is, for example, close to 0 relatively easily and quickly by a matrix operation by using a computer or the like in the first and the second calculation devices.

In another aspect of the GPS apparatus, the detection device detects the generation of the multi-path depending on whether or not the pseudo-range ri measured by the measurement device is unstable.

According to this aspect, the generation of the multi-path is detected by the detection device depending on whether or not the pseudo-range ri measured by the measurement device is unstable. In other words, if the pseudo-range ri is not unstable according to a predetermined standard, the detection device regards the multi-path as the one without generation, and if the pseudo-range ri is unstable according to the predetermined standard, the detection device regards the multi-path as the one with generation.

In this aspect, the detection device detects the generation of the multi-path on the basis of a variance of the pseudo-range ri measured by the measurement device.

By constituting in this manner, it is possible to detect the generation of the multi-path with a relatively high accuracy and ease on the basis of the fact that the variance or dispersion of measurement values often varies between the captured GPS satellites when the multi-path is generated.

The above object of the present invention can be achieved by a navigation system provided with: the above-mentioned GPS apparatus of the present invention (including its various aspects); the GPS receiver; and a display device for displaying on map data the current position data outputted from the output device in a predetermined format.

According to the navigation system of the present invention, because it is provided with the above-mentioned GPS apparatus, even if the multi-path is not generated in practice, even if the generation of the multi-path is properly detected, and even if the generation of the multi-path is misdetected, it is possible to display the current position data on map data on the basis of the stable positioning results.

The above object of the present invention can be also achieved by a program storage device readable by a computer. The program storage device stores a program of instructions to cause the computer to function as at least one portion of the above-described GPS apparatus of the present invention (including its various aspects).

According to the program storage device, such as a CD-ROM (Compact Disc-Read Only Memory), a ROM, a DVD (DVD Read Only Memory), a floppy disk or the like, of the present invention, the above described GPS apparatus of the present invention can be relatively easily realized as a computer reads and executes the program of instructions or as it executes the program after downloading the program through communication device. Moreover, the program of instructions can be sent from a central device with an application program required for the navigation or other data such as a map.

The above object of the present invention can be also achieved by a computer data signal embodied in a carrier wave and representing a series of instructions for a computer. The series of instructions causes the computer to function as at least one portion of the above-described GPS apparatus of the present invention (including its various aspects).

According to the computer data signal embodied in the carrier wave of the present invention, as the computer downloads the program in the computer data signal through a computer network or the like, and executes this program, it is possible to realize the above described GPS apparatus of the present invention.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(I) First Embodiment

At first, an on-vehicle navigation system in the first embodiment will be explained with reference to FIG. 1 to FIG. 5.

Figure 1:
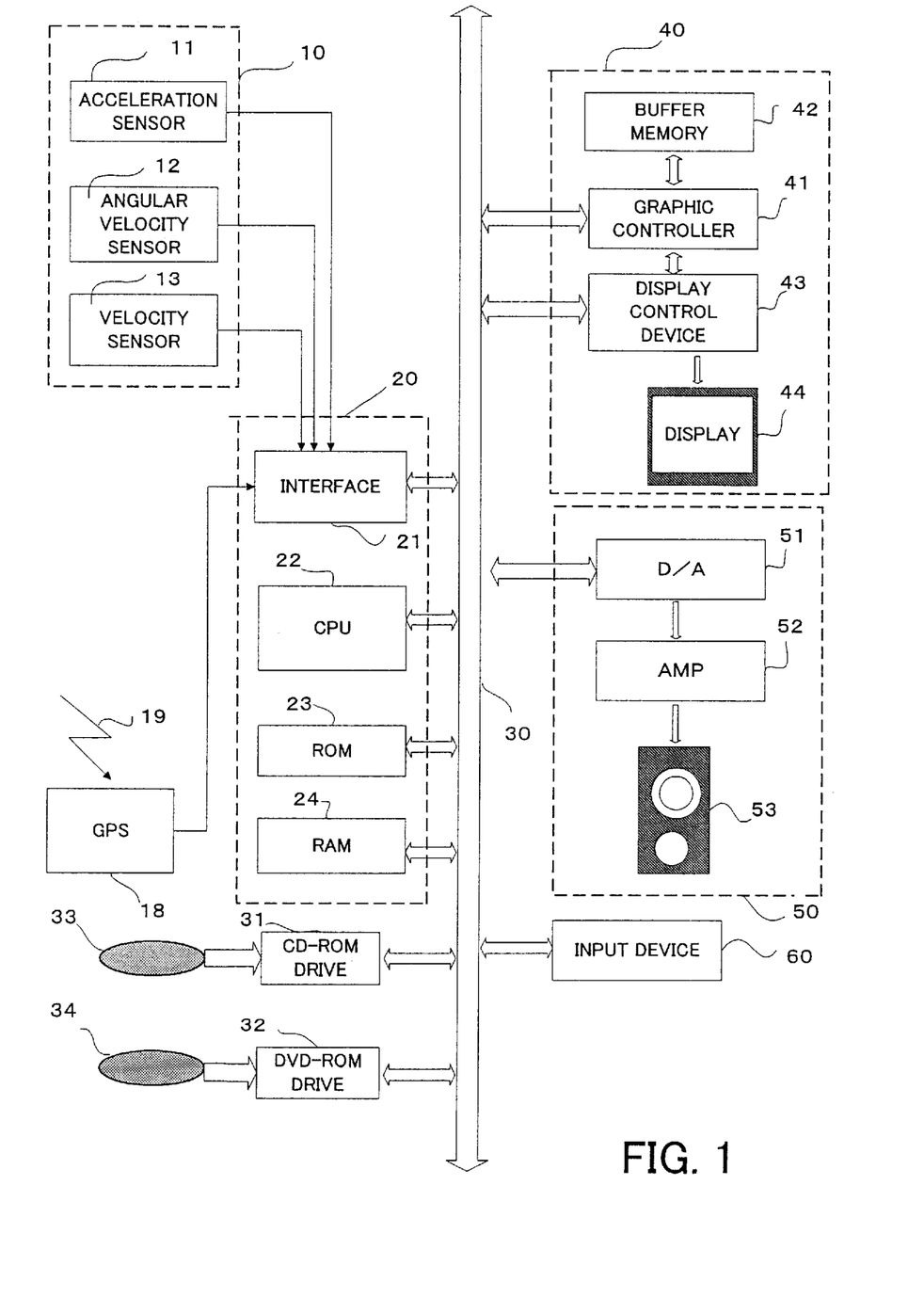
FIG. 1 is a block diagram of an on-vehicle navigation system as a first embodiment of the present invention.

As shown in FIG. 1, the on-vehicle navigation system in the first embodiment is provided with a self-contained positioning apparatus 10, a GPS receiver 18, a system controller 20, a CD-ROM drive 31, a DVD-ROM drive 32, a display unit 40, an audio output unit 50, and an input device 60.

The self-contained positioning apparatus 10 is constructed to include an acceleration sensor 11, an angular velocity sensor 12, and a velocity sensor 13. The acceleration sensor 11, which has, for example, a piezoelectric element, detects an acceleration of a vehicle and outputs acceleration data. The angular velocity sensor 12, which has, for example, a vibration gyro, detects an angular velocity of a vehicle when a direction of the vehicle is changed and outputs angular velocity data and relative azimuth data.

The velocity sensor 13 detects a rotation of a vehicle shaft mechanically, magnetically or optically and is constructed by a vehicle speed sensor, which generates a vehicle speed pulse as a pulse signal at every rotation for a predetermined angle around the vehicle shaft.

The GPS receiver 18 is a part to receive a radio wave 19, which carries the down link data including the data for positioning, from a plurality of GPS satellites to be used for the detection of an absolute position of a vehicle by information about latitude, longitude, or the like.

The system controller 20 includes an interface 21, a CPU (Central Processing Unit) 22, a ROM (Read Only Memory) 23 and a RAM (Random Access Memory) 24 and is constructed to control the whole navigation apparatus.

The interface 21 performs an interface operation with the acceleration sensor 11, the angular velocity sensor 12, the velocity sensor 13, and the GPS receiver 18. Then from them respectively, it inputs into the system controller 20 the acceleration data, the relative azimuth data, the angular velocity data, the GPS measurement data, the absolute azimuth data etc. in addition to the vehicle speed pulse. The CPU 22 controls the whole system controller 20. The ROM 23 has a not-illustrated non-volatile memory where a control program etc. for controlling the system controller 20 is stored. The RAM 24 readably stores various types of data such as route data, which are set in advance by a user through the input device 60, and supplies a working area to the CPU 22.

The system controller 20, the CD-ROM drive 31, the DVD-ROM drive 32, the display unit 40, the audio output unit 50, and the input device 60 are mutually connected through a bus line 30.

The CD-ROM drive 31 and the DVD-ROM drive 32 read, under the control of the system controller 20, a control program corresponding to each embodiment described below and various types of data such as road data etc. including the number of traffic lane, road width, and the like from a CD 33 and a DVD 34, respectively, and then output them. Incidentally, it is possible to dispose either one of the CD-ROM drive 31 and the DVD-ROM drive 32, and it is also possible to dispose a CD and DVD compatible drive.

The display unit 40 displays, under the control of the system controller 20, various types of display data. The display unit 40 is provided with: a graphic controller 41, which controls the whole display unit 40 on the basis of control data transmitted from the CPU 22 through the bus line 30; a buffer memory 42, which is constructed by a memory such as a VRAM (Video RAM) etc. and temporarily memorizes immediately displayable image information; a display control device 43, which controls of display of a display device 44 such as a liquid crystal device, a CRT (Cathode Ray Tube), or the like on the basis of image data outputted from the graphic controller 41; and the display device 44. The display device 44 is constructed by a liquid crystal display device etc., on the order of 5 to 10 inches in diagonal length for example and is installed around a front panel inside the vehicle.

The audio output unit 50 is provided with: a D/A (Digital to Analog) converter 51, which performs a D/A conversion of the sound digital data transmitted through the bus line 30 from the CD-ROM drive 31, the DVD-ROM 32, or the RAM 24 etc., under the control of the system controller 20; an amplifier (AMP) 52, which amplifies a sound analog signal outputted from the D/A converter 51; and a speaker 53, which converts the amplified sound analog signal to a sound and outputs it into the vehicle.

The input device 60 is provided with a key, a switch, a button, a remote controller, and so on, to input various types of commands and data. The input device 60 is installed around the display device 44 or the front panel of a main body of the on-vehicle navigation system, which is mounted on the vehicle.

Next, positional relationships between the GPS satellites and a vehicle on which the above-constructed on-vehicle navigation system is mounted and the principle of the GPS measurement will be explained with reference to FIG. 2 as well as FIG. 1.

Figure 2:
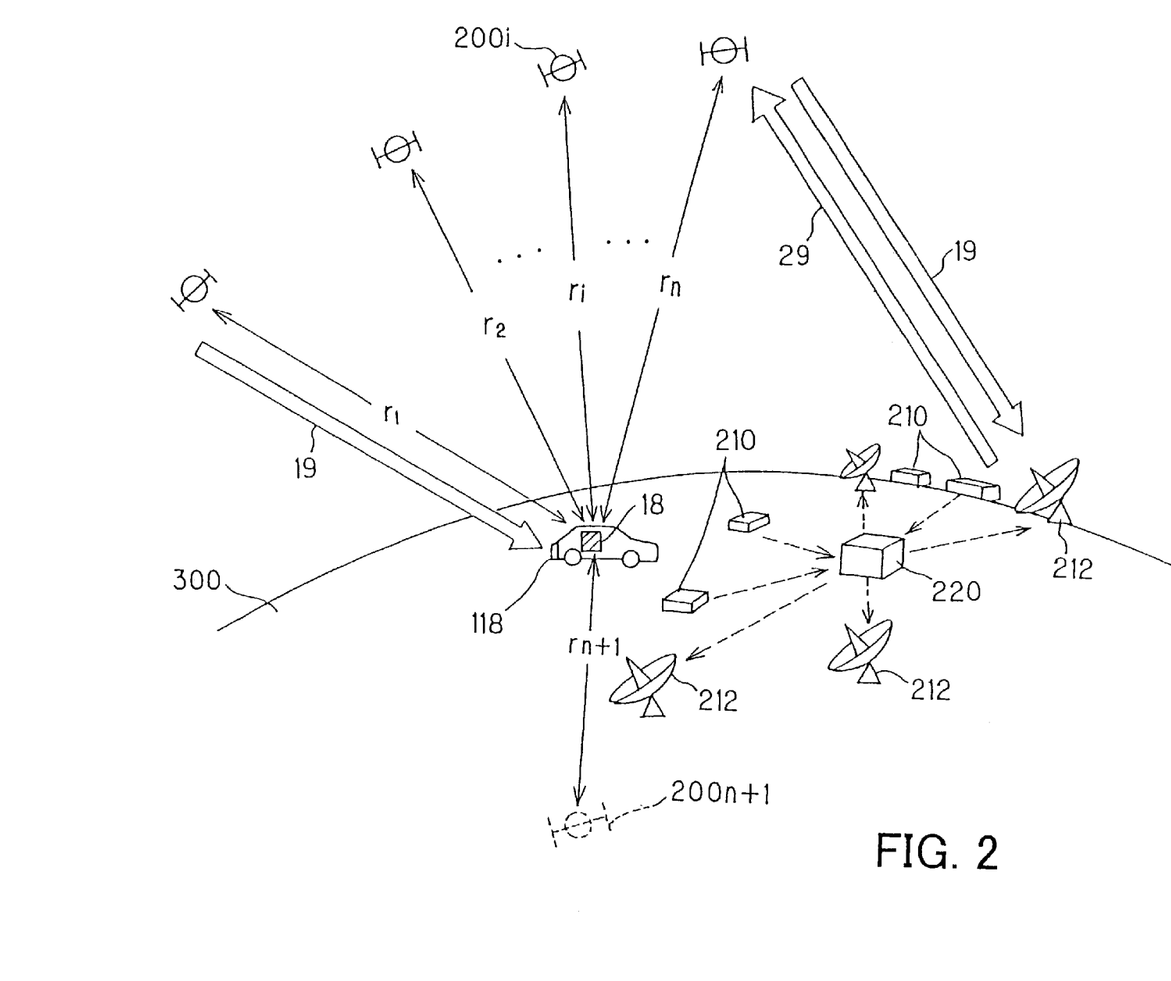
FIG. 2 is a schematic diagram of GPS measurement in the embodiment.

As shown FIG. 2, about twenty GPS satellites $200i$ are presently launched into the orbit of the earth 300, and as long as it is not within tunnels or huge buildings or is not hidden by them, a GPS receiver 18 can receive, at the same time, the radio waves 19 which carry the down link data sent from four or more GPS satellites $200i$, in general.

The radio waves 19, which carry the down link data sent from the respective GPS satellites $200i$, are received by monitor stations 210 on the earth 300, and are collected to a main control station 220. Then, the position of each GPS satellite $200i$ is obtained by solving Kepler's equation with system time in the down link data. Then, the obtained orbit constant (position) of each GPS satellite $200i$ is transmitted from a transmission station 212 to each GPS satellite $200i$ as one portion of a radio wave 29, which carries the up link data to the corresponding GPS satellite $200i$ as well as various information such as a calendar (almanac), a correction coefficient of a clock, and the like. Each GPS satellite $200i$, which receives them, transmits on the radio wave 19 its position information as well as various information such as a calendar (almanac), code for measuring distance, and the like, included in the down link data.

The GPS receiver 18 mounted on a vehicle 118 is constructed to receive the radio waves 19, which carry the down link data including the respective position information from a plurality of GPS satellites $200i$, and to measure the time length required for the radio wave 19 coming from each GPS satellite $200i$ to the GPS receiver 18.

In FIG. 1 and FIG. 2, especially in the first embodiment, the following examples are constructed by the system controller 20, which executes a computer program stored in the CD 33, the DVD 34, the ROM 23, or the like: one example of the measurement device for measuring a pseudo-range ri from the respective down link data carried in the radio waves 19 sent from n GPS satellites $200i$ (i=1, 2, . . . , n) captured by the GPS receiver 18 mounted on the vehicle 118; one example of the detection device for detecting the generation of the multi-path of the radio wave 19; one example of the first calculation device and one example of the second calculation device for calculating the coordinates of the vehicle 118 selectively depending on the detection result; and one example of the output device for outputting the coordinates of the vehicle 118 calculated by the first or the second calculation device as the current position data showing the current position of the vehicle 118. Here, the first calculation device is intended to calculate a clock error t and the coordinates (x, y, z) of the current position of the vehicle 118 approximately as a solution of n simultaneous equations by performing a convergence calculation according to Newton method, with respect to n functions fi (x, y, z, t) having such variables as the clock error t and the coordinates (x, y, z) of the vehicle 118, each of which represents the pseudo-range ri when the generation of the multi-path is not detected. On the other hand, the second calculation device is intended to calculate the clock error t and the coordinates (x, y, z) of the current position of the vehicle 118 approximately as a solution of n+1 simultaneous equations by performing a convergence calculation according to Newton method with respect to total n+1 functions, when the generation of the multi-path is detected. These n+1 functions are obtained by adding one α fn+1 (x, y, z, t) to n functions fi (x, y, z, t). This one α fn+1 (x, y, z, t) is obtained by applying a weighting α (α is a real number which is equal to or greater than 1) to one function fn+1 (x, y, z, t) having such variables as the clock error t and the coordinates (x, y, z), which represents a pseudo-range rn+1 obtained when the center of the earth is regarded as one GPS satellite $200n+1$.

Although the positioning solution is calculated by performing the convergence calculation according to Newton method in this embodiment, this method is one example to calculate an approximate solution, so that the other methods can be used for calculation of the positioning solution of the n simultaneous equations.

Here, the multi-path, which is the base of the selection of whether the first calculation device is used, or whether the second calculation device is used for the calculation of the current position coordinates of the vehicle 118 in this embodiment, will be explained with reference to FIG. 3 to FIG. 4.

Figure 3:
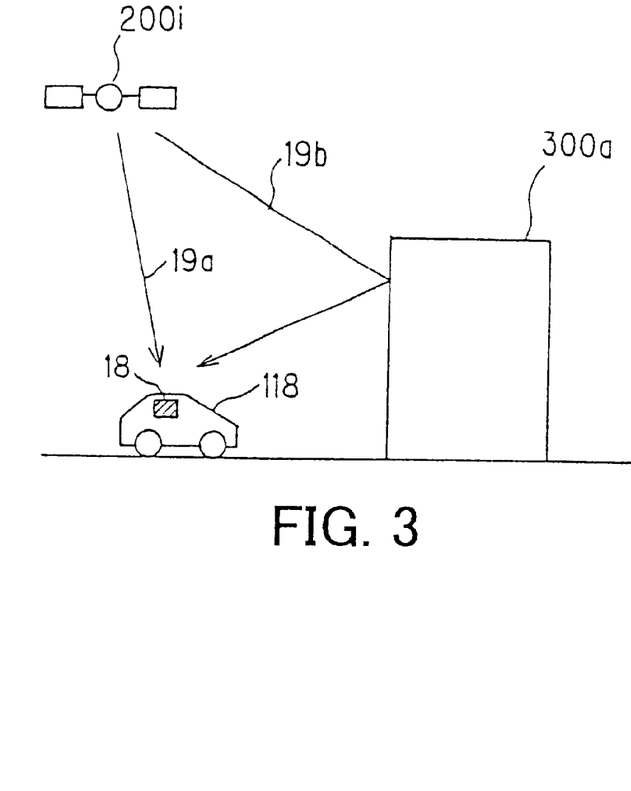
FIG. 3 is one schematic diagram showing a multi-path in the embodiment.
Figure 4:
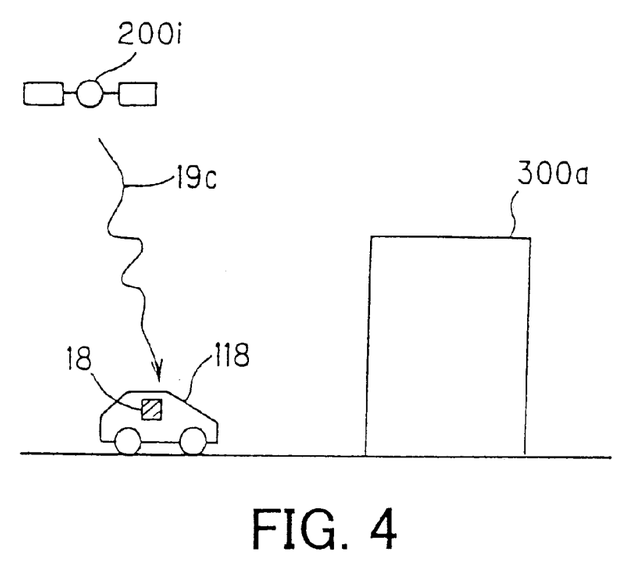
FIG. 4 is another schematic diagram showing a multi-path in the embodiment.

As shown in FIG. 3, the radio wave 19 from the GPS satellite $200i$ may have a reflected wave $19b$, which goes through another path to the GPS receiver 18 after reflecting once or more times on the surface of a building $300a$, in addition to a direct wave $19a$, which goes direct to the GPS receiver 18, around the building $300a$ such as a skyscraper, a high-rise building, or the like. As described above, when the direct wave $19a$ and the reflected wave $19b$ are received at the same time through a plurality of radio wave paths from the identical GPS satellite $200i$, i.e. when the multi-path is generated, an error occurs in the time length required for the direct wave $19a$ and the reflected wave $19b$ coming to the GPS receiver 18 and in the pseudo-range ri based on this error of the time. For example, if the multi-path is generated, the pseudo-range based on the direct wave $19a$ and the pseudo-ranged based on the reflected wave $19b$ are irregularly and alternatively measured in general, so that the arrival time and the pseudo-range ri are flickered or changed at a short cycle and thus the accuracy of the GPS measurement deteriorates extremely.

Theoretically speaking, detecting and eliminating only the reflected wave $19b$ are required. However, the fact is that the GPS receiver 18 receives a composite wave $19c$ of the direct wave and the reflected wave as shown in FIG. 4, so that it is difficult to detect which one is being received in practice. Consequently, when the multi-path is generated, the detection itself of the multi-path is relatively difficult, in addition to the difficulty in the detection and the elimination of only the reflected wave $19b$.

For example, in this embodiment, if the pseudo-range ri is not unstable on the basis of the dispersion or deviation of the pseudo-range ri to be measured, it is considered that the multi-path is not generated. If the pseudo-range ri is unstable, it is considered that the multi-path is generated. By constituting in this manner, it is possible to detect the generation of the multi-path with a relatively high accuracy and ease on the basis of the fact that the variance or dispersion of measurement values often varies between the captured GPS satellites 200*i* when the multi-path is generated. However, as evidenced by FIG. 4, it still has a possibility of misdetection of the multi-path generation.

Considering the above-mentioned detection characteristic of the multi-path, the GPS method is performed to obtain the stable GPS measurement result even when the multi-path is misdetected, when it is detected properly, or when it is not detected, as described below, in this embodiment.

The GPS method in the first embodiment and the second embodiment to be described below is intended to be executed mainly in the CPU 22, as shown in FIG. 1, and is executed as one portion of a main navigation program which controls the whole on-vehicle navigation system to perform a navigation operation. Therefore, while executing the main navigation system program, operations shown in each flow chart of the embodiments are always being executed. Moreover, the computer program in this kind may be stored in the ROM 23, the CD-ROM 33 or the DVD-ROM 34 and may be downloaded into the RAM 24 or the like through a communication device such as a modem, a cell phone, or the like. Instead of or in addition to it, map data etc. required for the navigation may be downloaded.

Next, the on-vehicle navigation system in the first embodiment, as constructed above, will be explained with reference to a flow chart in FIG. 5.

Figure 5:
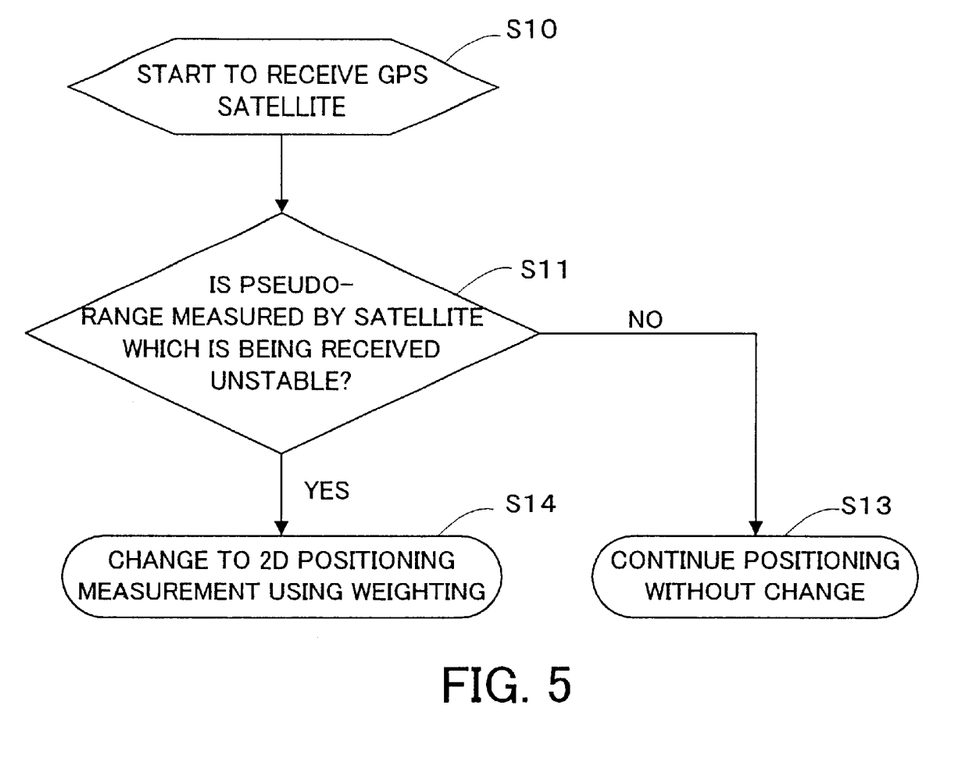
FIG. 5 is a flow chart showing a GPS method in the first embodiment.

In FIG. 5, when the GPS receiver 18 receives the radio wave 19 from the GPS satellite 200*i* (step S10), the pseudo-range ri is measured. This measurement is basically performed by measuring the required time for the arrival and by multiplying this by the velocity of light. Then, on the basis of whether or not the pseudo-range ri measured by the GPS satellite 200*i*, which is being received, is unstable, i.e., on the basis of the variance of the pseudo-range ri or the like, it is judged whether or not the multi-path is being generated (step S11).

As a result of this judgment, if the pseudo-range ri is not unstable (step S11: NO), it is considered that the multi-path is not generated, and positioning process continues without any change (step S13). Here, as the first calculation process, the convergence calculation is performed according to Newton method with respect to n functions fi (x, y, z, t), each of which indicates the pseudo-range ri (step S13). In other words, the clock error t and the coordinates (x, y, z) are approximately calculated as a positioning solution of n simultaneous equations. Consequently, under the condition that the multi-path is not generated, the coordinates (x, y, z) showing the current position of a movable body can be calculated with a high accuracy.

More concretely, if an approximate value of ri is ri', the n functions fi (x, y, z, t) are as follows:

$$ri'+(\partial ri/\partial x)\Delta x+(\partial ri/\partial y)\Delta y+(\partial ri/\partial z)\Delta z+(\partial ri/\partial t)\Delta t$$

In this case, the convergence calculation is a calculation for converging a pseudo-range error $\Delta ri=|ri-ri'|$ (i=1, 2, ... , n) within a predetermined value $\epsilon$, which is close to 0 ($\epsilon$ is a value set in advance experientially, experimentally, theoretically, or simulationally etc. depending on the required positioning accuracy), in the n simultaneous equations.

More specifically, when a pseudo-range error matrix of (n, 1) type is $\Delta R=(\Delta r1, \Delta r2, \ldots, \Delta rn)$ and a position error matrix of (4, 1) type is $\Delta X=(\Delta x, \Delta y, \Delta z, \Delta t)$ and a partial differential term matrix of (n, 4) type is A, the first calculation process calculates the positioning solution (x, y, z, t) in converging $\Delta R=A\cdot\Delta x$, as shown in Formula (1) below, within the predetermined value $\epsilon$.

$$\begin{pmatrix} \Delta r1 \\ \Delta r2 \\ \vdots \\ \Delta ri \\ \vdots \\ \Delta rn \end{pmatrix} = \begin{pmatrix} Ax,1 & Ay,1 & Az,1 & At,1 \\ Ax,2 & Ay,2 & Az,2 & At,2 \\ \vdots & \vdots & \vdots & \vdots \\ Ax,i & Ay,i & Az,i & At,i \\ \vdots & \vdots & \vdots & \vdots \\ Ax,n & Ay,n & Az,n & At,n \end{pmatrix} \begin{pmatrix} \Delta x \\ \Delta y \\ \Delta z \\ \Delta t \end{pmatrix} \quad (1)$$

On the other hand, if the pseudo-range ri is unstable as a result of the judgment in step S11 (step S11: YES), it is considered that the multi-path is generated, and the positioning method is changed from the above-mentioned 3D positioning method to the 2D positioning method using the weighting $\alpha$ (step S14). Here, the second calculation process in the 2D positioning method using the weighting $\alpha$ performs the convergence calculation according to Newton method with respect to the total n+1 functions obtained by adding one $\alpha$ fn+1 (x, y, z, t) to the n functions fi (x, y, z, t), each of which represents the pseudo-range ri, where $\alpha$ fn+1 (x, y, z, t) is obtained by applying a weighting $\alpha$ ($\alpha$ is a real number which is equal to or greater than 1) to one function fn+1 (x, y, z, t) having such variables as the clock error t and the coordinates (x, y, z), which represents the pseudo-range rn+1 obtained when the center of the earth is regarded as one GPS satellite. Consequently, it approximately calculates the clock error t and the coordinates (x, y, z) as a positioning solution of n+1 nonlinear simultaneous equations. Incidentally, the value of the weighting $\alpha$ used in step S14 can be appropriately set equal to or greater than 1, although when this value is greater than 1, it stabilizes the positioning solution, as described below, more effectively.

More concretely, if an approximate value of ri is ri', the n functions fi (x, y, z, t) are as follows:

$$ri'+(\partial ri/\partial x)\Delta x+(\partial ri/\partial y)\Delta y+(\partial ri/\partial z)\Delta z+(\partial ri/\partial t)\Delta t$$

On the contrary, if an approximate value of rn+1 is rn+1', the one function fn+1 (x, y, z, t) is as follows:

$$rn+1'+(\partial rn+1/\partial x)\Delta x+(\partial rn+1/\partial y)\Delta y+(\partial rn+1/\partial z)\Delta z+(\partial rn+1/\partial t)\Delta t$$

In this case, the convergence calculation is a calculation for converging the pseudo-range error $\Delta ri=|ri-ri'|$ (i=1, 2, ..., n, n+1) within the predetermined value $\epsilon$ in the n+1 simultaneous equations.

More specifically, when a pseudo-range error matrix of (n+1, 1) type, in which the weighting $\alpha$ is applied to the n+1th row, is $\Delta R=(\Delta r1, \Delta r2, \ldots, \Delta rn, \alpha\cdot\Delta rn+1)$, a position error matrix of (4, 1) type is $\Delta X=(\Delta x, \Delta y, \Delta z, \Delta t)$ and a partial differential term matrix of (n+1, 4) type is A, in which the weighting $\alpha$ is applied to the n+1th row, the second calculation process calculates the solution (x, y, z, t) in converging $\Delta R=A\cdot\Delta X$, as shown in Formula (2) below, within the predetermined value $\epsilon$.

$$\begin{pmatrix} \Delta r1 \\ \Delta r2 \\ \vdots \\ \Delta ri \\ \vdots \\ \Delta rn \\ \alpha \cdot \Delta rn+1 \end{pmatrix} = \begin{pmatrix} Ax,1 & Ay,1 & Az,1 & At,1 \\ Ax,2 & Ay,2 & Az,2 & At,2 \\ \vdots & \vdots & \vdots & \vdots \\ Ax,i & Ay,i & Az,i & At,i \\ \vdots & \vdots & \vdots & \vdots \\ Ax,n & Ay,n & Az,n & At,n \\ \alpha \cdot Ax,n+1 & \alpha \cdot Ay,n+1 & \alpha \cdot Az,n+1 & \alpha \cdot At,n+1 \end{pmatrix} \begin{pmatrix} \Delta x \\ \Delta y \\ \Delta z \\ \Delta t \end{pmatrix} \quad (2)$$

Especially in this case, the weighting $\alpha$ is performed with respect to the terms, which are placed at the bottom row and which are added in regarding the center of the earth 300 as one GPS satellite 200$n$+1, i.e. with respect to $\Delta rn+1$ in the left-side and Ax,n+1, Ay,n+1, Az,n+1, At,n+1 in the right-side partial differential term matrix (or a direction cosine matrix) A.

Consequently, according to the first embodiment, under the condition of the multi-path generation, as the weighting $\alpha$ is performed with respect to the terms associated with the pseudo-range rn+1 to be stabilized in correspondence to the condition that the earth is regarded as the GPS satellite in the step S14, the coordinates (x, y, z) as the positioning solution are stabilized. In the case that the generation of the multi-path is misdetected despite of non-generation of the multi-path, as the weighting $\alpha$ is performed with respect to the terms associated with the pseudo-range rn+1 to be stabilized in correspondence to the condition that the earth is regarded as the GPS satellite in the step S14, the coordinates (x, y, z) as the positioning solution are stabilized. On the contrary, under the condition of the non-generation of the multi-path, the coordinates (x, y, z) as the positioning solution are stable in the step S13 without changing to the 2D positioning method or using special weighting. Then, the current position coordinates of the vehicle 118, which have the decreased dispersion or deviation arose from an error caused by the multi-path generation or by misdetection of it, is displayed as the current position data on a display map on the display device 44 (refer to FIG. 1).

(II) Second Embodiment

Figure 6:
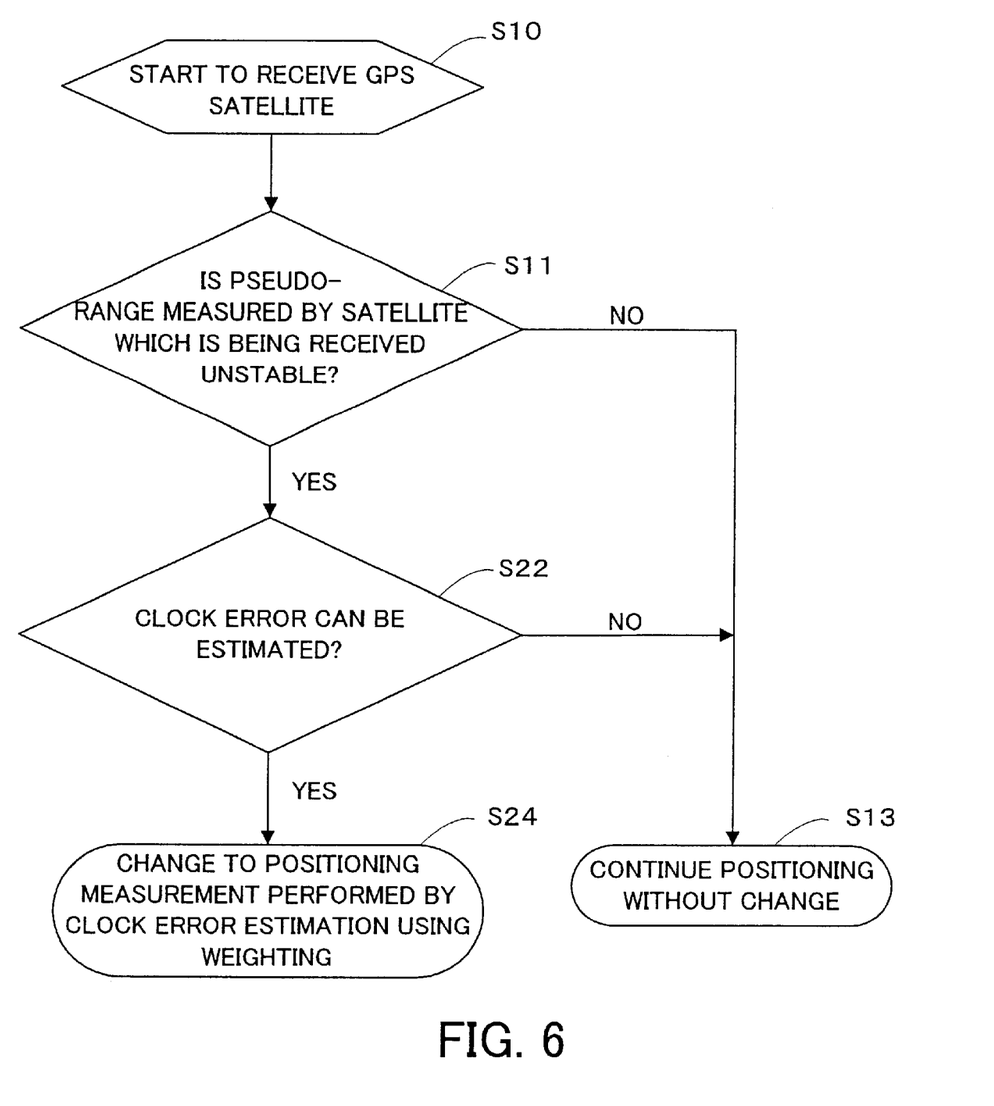
FIG. 6 is a flow chart showing a GPS method in a second embodiment.

Next, the second embodiment of the present invention will be explained with reference to FIG. 6. FIG. 6 is a flow chart showing a GPS method in the second embodiment. Incidentally, the hardware structure in the second embodiment is the same as the one in the first embodiment shown in FIG. 1. The same steps as those in FIG. 5 carry the same step numerals and the detailed explanations of them are omitted.

The GPS method in the second embodiment uses a function $fn+1$ (x, y, z, t) which estimates the clock error t instead of the one function in the first embodiment, which is added when the center of the earth 300 is regarded as one GPS satellite 200$n$+1. As the function which estimates the clock error t, it is possible to use the one used in two satellites positioning method, which is known to those skilled in the art and the concrete explanations of the function are omitted.

In FIG. 6, step S10 to step S13 are performed in the same manner as the first embodiment.

Then, if the pseudo-range ri is unstable as a result of the judgment in step S11 (step S11: YES), it is considered that the multi-path is generated and it is judged whether or not the clock error t can be estimated (step S22). Here, the term "clock error t" is a time error of the GPS receiver 18 and the GPS satellite and is caused by impossibility of complete synchronization of a quarts clock of the GPS receiver 18 and an atomic clock of the GPS satellite. It can be estimated by the GPS receiver 18 on the basis of the down link data depending on a condition of receiving the radio wave 19 including the down link data. Then, if the clock error t can not be estimated as a result of this judgment (step S22: NO), the operational flow branches off to the step S13 and the above-mentioned positioning process continues without any change.

On the other hand, if the clock error t can be estimated as a result of the judgment in step S22 (step S22: YES), the positioning method is changed from the above-described 3D positioning method to the one performed by the time error estimation using the weighting $\alpha$. Here, the second calculation process in the positioning method performed by the time error estimation using the weighting $\alpha$ performs the convergence calculation according to Newton method with respect to the total n+1 functions obtained by adding the one $\alpha\ fn+1$ (x, y, z, t) to the n functions fi (x, y, z, t), each of which indicates the pseudo-range ri, where $\alpha\ fn+1$ (x, y, z, t) is obtained by the weighting $\alpha$ ($\alpha$ is a real number which is equal to or greater than 1) to the one function fn+1 (x, y, z, t) which estimates the clock error (step S24). Consequently, in the substantially same manner as the first embodiment, it approximately calculates the clock error t and the coordinates (x, y, z) as a positioning solution of n+1 nonlinear simultaneous equations, as shown in the Formula (2). Incidentally, the value of the weighting $\alpha$ used in step S24 can be appropriately set equal to or greater than 1, although when this value is greater than 1, it stabilizes the positioning solution more effectively.

Especially in this case, the weighting $\alpha$ is performed with respect to the terms which are placed at the bottom row and which are added in positioning after the estimation of the clock error t in the above Formula (2), i.e. with respect to $\Delta rn+1$ in the left-side and Ax,n+1, Ay,n+1, Az,n+1, At,n+1 in the right-side partial differential term matrix (or a direction cosine matrix) A.

Consequently, according to the second embodiment, under the condition of the multi-path generation, as the weighting $\alpha$ is applied to the terms associated with the pseudo-range rn+1 to be stabilized in correspondence to the positioning method performed by the time error estimation in the step S24, the coordinates (x, y, z) as the positioning solution are stabilized. In the case that the generation of the multi-path is misdetected despite of non-generation of the multi-path, as the weighting $\alpha$ is applied to the terms associated with the pseudo-range rn+1 to be stabilized in correspondence to the positioning method performed by the time error estimation in the step S24, the coordinates (x, y, z) as the positioning solution are stabilized. On the contrary, under the condition of the non-generation of the multi-path, the coordinates (x, y, z) as the positioning solution are stable in the step S13 without changing to the positioning method performed by the time error estimation or using the special the weighting. Then, the current position coordinates of the vehicle 118, which have the decreased dispersion or deviation arose from an error caused by the multi-path generation or by misdetection of it, is displayed as the current position data on a display map on the display device 44 (refer to FIG. 1).

Although each embodiment described above is associated with an on-vehicle navigation system, the GPS method and the GPS apparatus of the present invention are not limited by this and are allowed to use as those for providing a stable positioning of the current position of an arbitrary movable body such as an animal, a human etc., who moves with the navigation system, as well as an airplane, a ship, or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-137795 filed on May 8, 2001 including the specification, claims, drawings and summary is incorporated herein by reference in its entirety.

What is claimed is:

1. A GPS method comprising:

a measurement process of measuring each pseudo-range ri (i=1, 2, . . . , n) from respective one of received radio waves from n GPS satellites (n is a natural number equal to or greater than 3) captured by a GPS receiver mounted on a movable body;

a detection process of detecting a generation of a multi-path of the respective one of the received radio waves;

a first calculation process of approximately calculating a clock error t and coordinates (x, y, z) of the GPS receiver as a solution of n simultaneous equations by performing a convergence calculation with respect to n functions fi (x, y, z, t) having such variables as the clock error t and the coordinates (x, y, z), each of the n functions fi (x, y, z, t) representing the pseudo-range ri;

a second calculation process of approximately calculating the clock error t and the coordinates (x, y, z) as a solution of n+1 simultaneous equations by performing a convergence calculation with respect to total n+1 functions obtained by adding one $\alpha$ fn+1 (x, y, z, t) to the n functions fi (x, y, z, t), where the one $\alpha$ fn+1 (x, y, z, t) is obtained by applying a weighting $\alpha$ ($\alpha$ is a real number which is equal to or greater than 1) to one function fn+1 (x, y, z, t) having such variables as the clock error t and the coordinates (x, y, z), the one function fn+1 (x, y, z, t) representing a pseudo-range rn+1 obtained when the center of the earth is regarded as one GPS satellite;

an output process of outputting the coordinates (x, y, z) calculated in said first or second calculation process as current position data, which indicate a current position of the movable body; and a selection process of selecting said second calculation process when the generation of the multi-path is detected by said detection process.

2. A GPS method according to claim 1, wherein the n functions fi (x, y, z, t) are as follows:

ri'+($\partial$ri/$\partial$x)$\Delta$x+($\partial$ri/$\partial$y)$\Delta$y+($\partial$ri/$\partial$z)$\Delta$z+($\partial$ri/$\partial$t)$\Delta$t, where ri' is an approximate value of ri, the one function fn+1 (x, y, z, t) is as follows:

rn+1'+($\partial$rn+1/$\partial$x)$\Delta$x+($\partial$rn+1/$\partial$y)$\Delta$y+($\partial$rn+1/$\partial$z)$\Delta$z +($\partial$rn+1/$\partial$t)$\Delta$t, where rn+1' is an approximate value of rn+1, and the convergence calculation is a calculation for converging a pseudo-range error $\Delta$ri=|ri−ri'| (i=1, 2, . . . , n) within a predetermined value in the n simultaneous equations in said first calculation process and a calculation for converging a pseudo-range error $\Delta$ri=|ri−ri'| (i=1, 2, . . . , n, n+1) within a predetermined value in the n+1 simultaneous equations in said second calculation process.

3. A GPS method according to claim 1, wherein said second calculation process uses a function fn+1 (x, y, z, t) which estimates the clock error t, instead of the one function.

4. A GPS method according to claim 1, wherein said first calculation process calculates a positioning solution (x, y, z, t) in converging $\Delta$R=A·$\Delta$X within a predetermined value when a pseudo-range error matrix of (n, 1) type is $\Delta$R=($\Delta$r1, $\Delta$r2, . . . , $\Delta$rn) and a position error matrix of (4, 1) type is $\Delta$X=($\Delta$x, $\Delta$y, $\Delta$z, $\Delta$t) and a partial differential term matrix of (n, 4) type is A, and said second calculation process calculates a solution (x, y, z, t) in converging $\Delta$R=A·$\Delta$X within a predetermined value when a pseudo-range error matrix of (n+1, 1) type, in which the weighting $\alpha$ is applied to the n+1th row, is $\Delta$R=($\Delta$r1, $\Delta$r2, . . . , $\Delta$rn, $\alpha$·$\Delta$rn+1) and a position error matrix of (4, 1) type is $\Delta$X=($\Delta$x, $\Delta$y, $\Delta$z, $\Delta$t) and a partial differential term matrix of (n+1, 4) type in which the weighting $\alpha$ is applied to the n+1th row is A.

5. A GPS method according to claim 1, wherein said detection process detects the generation of the multi-path depending on whether or not the pseudo-range ri measured by said measurement process is unstable.

6. A GPS method according to claim 5, wherein said detection process detects the generation of the multi-path on the basis of a variance of the pseudo-range ri measured by said measurement process.

7. A GPS apparatus comprising:

a measurement device for measuring each pseudo-range ri (i=1, 2, . . . , n) from respective one of received radio waves from n GPS satellites (n is a natural number equal to or greater than 3) captured by a GPS receiver mounted on a movable body;

a detection device for detecting a generation of a multi-path in the respective one of the received radio waves;

a first calculation device for approximately calculating a clock error t and coordinates (x, y, z) of the GPS receiver as a solution of n simultaneous equations by performing a convergence calculation with respect to n functions fi (x, y, z, t) having such variables as the clock error t and the coordinates (x, y, z), each of the n functions fi (x, y, z, t) representing the pseudo-range ri;

a second calculation device for approximately calculating the clock error t and the coordinates (x, y, z) as a solution of n+1 simultaneous equations by performing a convergence calculation with respect to total n+1 functions obtained by adding one $\alpha$ fn+1 (x, y, z, t) to the n functions fi (x, y, z, t), where the one $\alpha$ fn+1 (x, y, z, t) is obtained by applying a weighting $\alpha$ ($\alpha$ is a real number which is equal to or greater than 1) to one function fn+1 (x, y, z, t) having such variables as the clock error t and the coordinates (x, y, z), the one function fn+1 (x, y, z, t) representing a pseudo-range rn+1 obtained when the center of the earth is regarded as one GPS satellite;

an output device for outputting the coordinates (x, y, z) calculated in said first or second calculation device as current position data, which indicate a current position of the movable body; and a selection device for selecting said second calculation device when the generation of the multi-path is detected by said detection device.

8. A GPS apparatus according to claim 7, wherein the n functions fi (x, y, z, t) are as follows:

ri'+($\partial$ri/$\partial$x)$\Delta$x+($\partial$ri/$\partial$y)$\Delta$y+($\partial$ri/$\partial$z)$\Delta$z+($\partial$ri/$\partial$t)$\Delta$t, where ri' is an approximate value of ri, the one function fn+1 (x, y, z, t) is as follows:

rn+1'+($\partial$rn+1/$\partial$x)$\Delta$x+($\partial$rn+1/$\partial$y)$\Delta$y+($\partial$rn+1/$\partial$z)$\Delta$z+ ($\partial$rn+1/$\partial$t)$\Delta$t, where rn+1' is an approximate value of rn+1, and the convergence calculation is a calculation for converging a pseudo-range error $\Delta$ri=|ri−ri'| (i=1, 2, ... , n) within a predetermined value in the n simultaneous equations in said first calculation device and a calculation for converging a pseudo-range error $\Delta$ri= |ri−ri'| (i=1, 2, ... , n, n+1) within a predetermined value in the n+1 simultaneous equations in said second calculation device.

9. A GPS apparatus according to claim 7, wherein said second calculation device uses a function fn+1 (x, y, z, t) which estimates the clock error t, instead of the one function.

10. A GPS apparatus according to claim 7, wherein said first calculation device calculates a positioning solution (x, y, z, t) in converging $\Delta$R=A·$\Delta$X within a predetermined value when a pseudo-range error matrix of (n, 1) type is $\Delta$R=($\Delta$r1, $\Delta$r2, ... , $\Delta$rn) and a position error matrix of (4, 1) type is $\Delta$X=($\Delta$x, $\Delta$y, $\Delta$z, $\Delta$t) and a partial differential term matrix of (n, 4) type is A, and said second calculation device calculates a solution in converging $\Delta$R=A·$\Delta$X within a predetermined value when a pseudo-range error matrix of (n+1, 1) type, in which the weighting $\alpha$ is applied to the n+1th row, is $\Delta$R=($\Delta$r1, $\Delta$r2, ... , $\Delta$rn, $\alpha$·$\Delta$rn+1) and a position error matrix of (4, 1) type is $\Delta$X=($\Delta$x, $\Delta$y, $\Delta$z, $\Delta$t) and a partial differential term matrix of (n+1, 4) type in which the weighting $\alpha$ is applied to the n+1th row is A.

11. A GPS apparatus according to claim 7, wherein said detection device detects the generation of the multi-path depending on whether or not the pseudo-range ri measured by said measurement device is unstable.

12. A GPS apparatus according to claim 11, wherein said detection device detects the generation of the multi-path on the basis of a variance of the pseudo-range ri measured by said measurement device.

13. A navigation system comprising:

(i) a GPS apparatus comprising:

a measurement device for measuring each pseudo-range ri (i=1, 2, ... , n) from respective one of received radio waves from n GPS satellites (n is a natural number equal to or greater than 3) captured by a GPS receiver mounted on a movable body;

a detection device for detecting a generation of a multi-path in the respective one of the received radio waves;

a first calculation device for approximately calculating a clock error t and coordinates (x, y, z) of the GPS receiver as a solution of n simultaneous equations by performing a convergence calculation with respect to n functions fi (x, y, z, t) having such variables as the clock error t and the coordinates (x, y, z), each of the n functions fi (x, y, z, t) representing the pseudo-range ri;

a second calculation device for approximately calculating the clock error t and the coordinates (x, y, z) as a solution of n+1 simultaneous equations by performing a convergence calculation with respect to total n+1 functions obtained by adding one $\alpha$ fn+1 (x, y, z, t) to the n functions fi (x, y, z, t), where the one $\alpha$ fn+1 (x, y, z, t) is obtained by applying a weighting $\alpha$ ($\alpha$ is a real number which is equal to or greater than 1) to one function fn+1 (x, y, z, t) having such variables as the clock error t and the coordinates (x, y, z), the one function fn+1 (x, y, z, t) representing a pseudo-range rn+1 obtained when the center of the earth is regarded as one GPS satellite;

an output device for outputting the coordinates (x, y, z) calculated in said first or second calculation device as current position data, which indicate a current position of the movable body; and a selection device for selecting said second calculation device when the generation of the multi-path is detected by said detection device, (ii) the GPS receiver; and (iii) a display device for displaying on map data the current position data outputted from said output device in a predetermined format.

14. A program storage device readable by a computer, tangibly embodying a program of instructions executable by the computer to perform method processes of outputting current position data, which indicate a current position of a movable body, said method processes comprising:

a measurement process of measuring each pseudo-range ri (i=1, 2, ... , n) from respective one of received radio waves from n GPS satellites (n is a natural number equal to or greater than 3) captured by a GPS receiver mounted on a movable body;

a detection process of detecting a generation of a multi-path of the respective one of the received radio waves;

a first calculation process of approximately calculating a clock error t and coordinates (x, y, z) of the GPS receiver as a solution of n simultaneous equations by performing a convergence calculation with respect to n functions fi (x, y, z, t) having such variables as the clock error t and the coordinates (x, y, z), each of the n functions fi (x, y, z, t) representing the pseudo-range ri;

a second calculation process of approximately calculating the clock error t and the coordinates (x, y, z) as a solution of n+1 simultaneous equations by performing a convergence calculation with respect to total n+1 functions obtained by adding one $\alpha$ fn+1 (x, y, z, t) to the n functions fi (x, y, z, t), where the one $\alpha$ fn+1 (x, y, z, t) is obtained by applying a weighting $\alpha$ ($\alpha$ is a real number which is equal to or greater than 1) to one function fn+1 (x, y, z, t) having such variables as the clock error t and the coordinates (x, y, z), the one function fn+1 (x, y, z, t) representing a pseudo-range rn+1 obtained when the center of the earth is regarded as one GPS satellite;

an output process of outputting the coordinates (x, y, z) calculated in said first or second calculation process as current position data, which indicate a current position of the movable body; and a selection process of selecting said second calculation process when the generation of the multi-path is detected by said detection process.

15. A computer data signal embodied in a carrier wave and representing a series of instructions which cause a computer to perform method processes of outputting current position data, which indicate a current position of a movable body, said method processes comprising:

a measurement process of measuring each pseudo-range $r_i$ ($i=1, 2, \ldots, n$) from respective one of received radio waves from n GPS satellites (n is a natural number equal to or greater than 3) captured by a GPS receiver mounted on a movable body;

a detection process of detecting a generation of a multi-path of the respective one of the received radio waves;

a first calculation process of approximately calculating a clock error t and coordinates (x, y, z) of the GPS receiver as a solution of n simultaneous equations by performing a convergence calculation with respect to n functions $f_i$ (x, y, z, t) having such variables as the clock error t and the coordinates (x, y, z), each of the n functions $f_i$ (x, y, z, t) representing the pseudo-range $r_i$;

a second calculation process of approximately calculating the clock error t and the coordinates (x, y, z) as a solution of n+1 simultaneous equations by performing a convergence calculation with respect to total n+1 functions obtained by adding one $\alpha$ $f_{n+1}$ (x, y, z, t) to the n functions $f_i$ (x, y, z, t), where the one $\alpha$ $f_{n+1}$ (x, y, z, t) is obtained by applying a weighting $\alpha$ ($\alpha$ is a real number which is equal to or greater than 1) to one function $f_{n+1}$ (x, y, z, t) having such variables as the clock error t and the coordinates (x, y, z), the one function $f_{n+1}$ (x, y, z, t) representing a pseudo-range $r_{n+1}$ obtained when the center of the earth is regarded as one GPS satellite;

an output process of outputting the coordinates (x, y, z) calculated in said first or second calculation process as current position data, which indicate a current position of the movable body; and a selection process of selecting said second calculation process when the generation of the multi-path is detected by said detection process.

* * * * *